United States Patent [19]
Kindig

[11] 4,110,771
[45] Aug. 29, 1978

[54] DOUBLE EXPOSURE PREVENTION MECHANISM

[75] Inventor: Guilford Edwin Kindig, Rochester, N.Y.

[73] Assignee: Eastman Kodak Company, Rochester, N.Y.

[21] Appl. No.: 780,151

[22] Filed: Mar. 22, 1977

[51] Int. Cl.² .............................................. G03B 19/02
[52] U.S. Cl. ...................................... 354/207; 354/83; 354/268
[58] Field of Search .................. 354/207, 83, 268, 206

[56] References Cited

U.S. PATENT DOCUMENTS

| | | | |
|---|---|---|---|
| 636,036 | 10/1899 | Goodell et al. | 354/207 |
| 2,629,302 | 2/1953 | Mihalyi | 354/206 |
| 2,722,872 | 11/1955 | Schrader | 354/207 |
| 3,512,466 | 5/1970 | Fauth et al. | 354/207 |
| 4,040,072 | 8/1977 | Johnson et al. | 354/268 |
| 4,047,192 | 9/1977 | Johnson et al. | 354/83 |

*Primary Examiner*—Richard A. Wintercorn
*Attorney, Agent, or Firm*—D. P. Monteith

[57] ABSTRACT

A camera having a self-cocking shutter with a shutter actuating member for initiating exposures and a film unit advancing member for advancing film units into the nip of a processing roller assembly, includes a shutter actuating member latch that is coupled to the film unit advancing member. The shutter actuating member latch serves as a double exposure prevention latch when the film unit advancing member has not advanced a previously exposed film unit.

3 Claims, 4 Drawing Figures

DOUBLE EXPOSURE PREVENTION MECHANISM

CROSS-REFERENCE TO RELATED APPLICATIONS

Reference is made to commonly assigned, co-pending U.S. Pat. applications: Ser. No. 780,149, filed Mar. 22, 1977, in the name of Donald M. Harvey, and entitled IMPROVED PHOTOGRAPHIC APPARATUS FOR USE WITH SELF-PROCESSING FILM UNITS; and Ser. No. 780,148, filed Mar. 22, 1977 in the names of Guilford E. Kindig and Chester W. Michatek, and entitled PHOTOGRAPHIC APPARATUS WITH IMPROVED CONTROL OF CAMERA VIBRATION.

BACKGROUND OF THE INVENTION

1. Field of the Invention

The present invention relates to photographic apparatus, and more particularly, to a double exposure prevention mechanism that cooperates with a shutter driving member and a film advance member.

2. Description of the Prior Art

In cameras of the type having self-cocking shutters, i.e., shutters which are automatically cocked upon return of the body release member, it is known to employ means for disabling the shutter after an exposure and prior to the advance of the exposed film in order to prevent double exposure. Generally, such double exposure prevention means have taken the form of linkage adapted to block the body release member of the camera after an exposure and to free the body release member upon subsequent advancement of exposed film. (See U.S. Pats. No. 636,036 and 2,722,872)

Some of the double exposure prevention mechanisms of the above-described type have the drawback that if the camera operator attempts to overcome the blocking force on the body release member, damage to the camera mechanism may result. It may further be undesirable to block the movement of the body release member if the body release member is adapted to perform auxiliary functions upon partial movement towards its exposure initiating position, e.g., partial depression of the body release member may actuate such auxiliary functions as battery check or low light level signal. The photographer may wish to operate these functions after an exposure but prior to the next film advance.

Recently, photographic apparatus has been developed having a double exposure prevention latch that cooperates with a piezoelectric flash firing spring to disable the driving member of a self-cocking shutter when the piezoelectric operator is not cocked. (See U.S. Pat. application Ser. No. 678,271, entitled DOUBLE EXPOSURE PREVENTION DEVICE, filed Apr. 19, 1976 in the names of William T. Hochreiter and Fredric A. Mindler now U.S. Pat. No. 4,052,730 issued Oct. 4, 1977). In this device, the body release member may be fully depressed after the exposure but prior to subsequent film advance without actuating the shutter. In cameras wherein the piezoelectric generator is not cocked until the film is advanced, this approach works very well, however, in cameras where the piezoelectric generator is self-cocking upon return of the body release member, the above-noted approach is not applicable. Such a camera is described in the above-referenced copending U.S. Pat. applications.

The present invention is directed to a double exposure prevention device for use in such a camera.

SUMMARY OF THE INVENTION

Accordingly, photographic apparatus having: a self-cocking shutter; a shutter actuating member adapted to move from a first position to a second position for opening the shutter; a body release member which is biased towards a first position and movable to a second position for initiating a photographic operation; and a film advance member which is releasably held in a first position and movable from its first position through an intermediate position to a second position preparatory to advancing film and movable from its second position toward its first position for advancing film, includes a latch member coupled to the film advance member and cooperating with the shutter actuating member for releasably retaining the shutter actuating member in its first position when the film advance member is in its first position or its second position and for releasing the shutter actuating means in response to movement of the film advance member from its first position to its intermediate position.

DESCRIPTION OF THE DRAWINGS

In the detailed description of the preferred embodiment of the invention presented below, reference is made to the accompanying drawings wherein.

DESCRIPTION OF THE PREFERRED EMBODIMENT

Because photographic apparatus is well known, the present description will be directed in particular to elements forming part of, or cooperating more directly with, the present invention. Elements not specifically shown or described herein are understood to be selectable from those known in the art.

Figure 1:
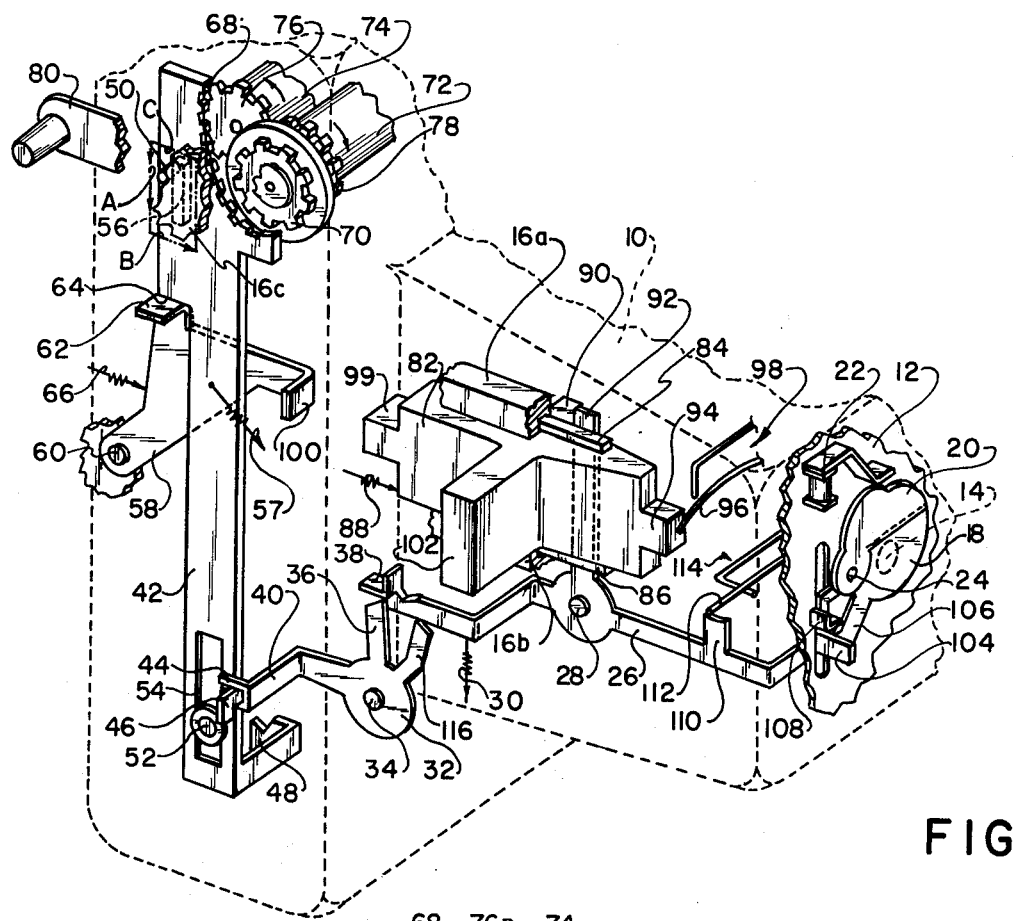
FIG. 1 is a perspective view of a photographic apparatus according to the present invention showing the apparatus in a cocked state prior to effecting a photographic operation.

As seen in FIG. 1, photographic apparatus according to the present invention is contained within a camera housing 10 outlined in phantom. The apparatus includes a camera body having a front portion 12 shown partly broken away that forms an exposure aperture 14 to which light passes to effect exposure of photographic film (not shown) and side body portions 16a, b, and c shown in broken away portions. A shutter mechanism mounted on front body portion 12 includes an opening blade 18, a closing blade 20, and an electromagnetic latch 22. Opening blade 18 and closing blade 20 are pivotally mounted on front body portion 12 by means of a pin 24. A shutter actuating member 26 is pivotally mounted on the body of the camera by means of a pin 28.

A spring 30 connected to shutter actuating member 26 normally biases the shutter actuating member in a counterclockwise direction. Shutter actuating member 26 is held in a first position as shown in FIG. 1 by means of a latch member 32 that is pivotally mounted on the camera body by means of a pin 34. Latch member 32 includes a first leg 36 that is adapted to engage an extension 38 of shutter actuating member 26 to releasably retain the shutter actuating member in the position shown in FIG. 1. Latch member 32 further includes a second leg 40 that is coupled to a slidably mounted film advance member 42 by means of a fork 44 on extension 40 of latch member 32 which engages a tab 46 on film advance member 42. Film advance member 42 includes a picker 48 on one end and a pin 50 on its other end. Film advance member 42 is slidably mounted with respect to the body portion of the camera by means of a pin 52 extending through a slot 54 and is movable from a first position, shown in FIG. 1; through an intermediate position, shown in FIG. 3; to a second position shown in FIG. 4, and subsequently back to the first position. The film advance member is urged generally downwardly and in a clockwise direction about pin 52 by means of a spring 57. Pin 50 on film advance member 42 cooperates with an island 56 that projects inwardly from the camera body portion 16c to restrict the range of motion of the upper end of film advance member 42 to a path consisting of segments A, B, and C indicated in dotted lines in FIG. 1.

A latch 58 is pivotally mounted on the camera body by a pin 60 and includes a tab 62 that is adapted to engage and edge 64 of film advance member 42 to retain film advance member 42 in the position shown in FIG. 1. Latch member 58 is normally urged in a clockwise direction by means of a spring 66. Film advance member 42 further includes a generally L-shaped rack portion 68 which is engageable with a pinion gear 70 connectd to the end of a processing roller 72.

Processing roller 72 is coupled to a second processing roller 74 by means of a pair of gears 76 and 78. A crank 80, shown partially broken away, is connected to the center of gear 70 and is accessible to the operator for driving gear 70 in a clockwise direction and thereby rotates processing rollers 72 and 74.

A body release meber 82 is slidably mounted on camera body portions 16a and 16b by means or rails 84 and 86 and is generally urged toward a first position toward the front of the camera by means of a spring 88. An extension 90 on body release member 82 is adapted to engage a leg 92 on shutter actuating member 26. Body release member 82 includes a nose portion 94 that is adapted to engage a contact 96 of a switch 98 to maintain switch 98 in an open condition when body release member 82 is in the position shown in FIG. 1. Body release member 82 further includes a tail portion 99 that is adapted to engage a tab 100 on latch member 58 when body release member 82 is slid toward a second position toward the rear of the camera.

Figure 2:
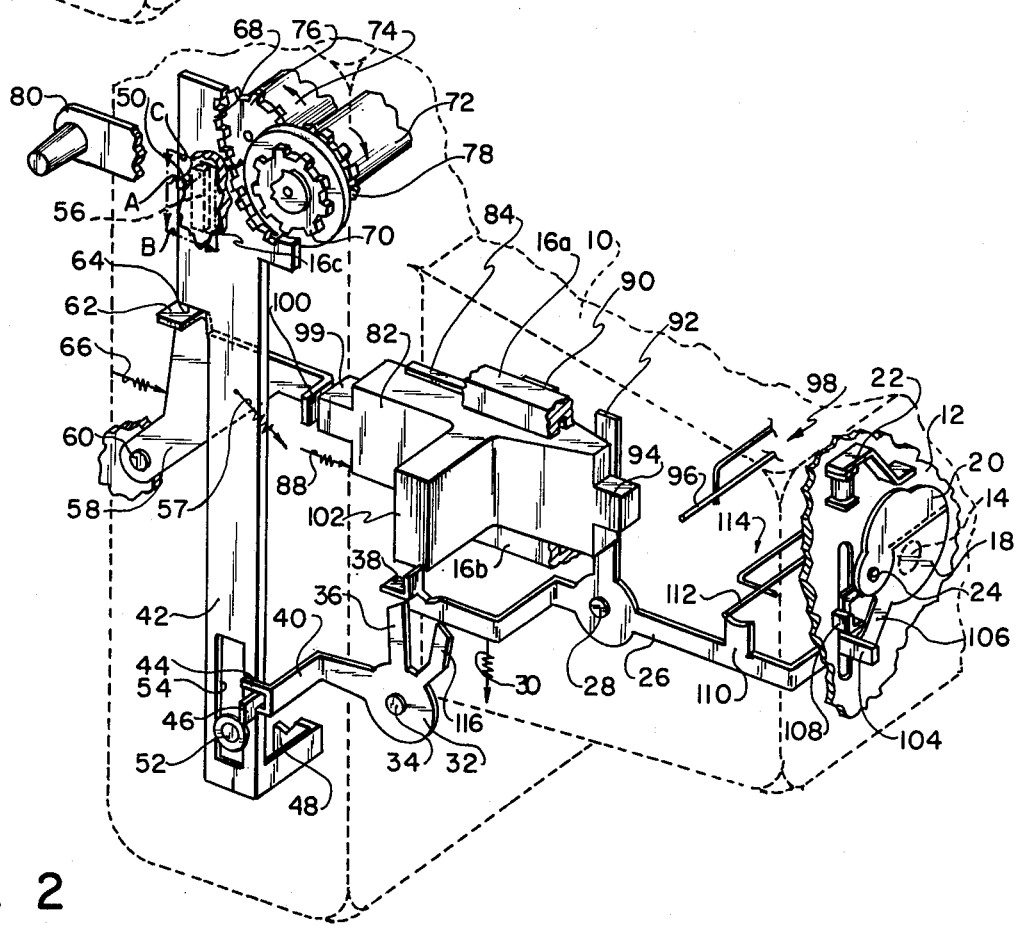
FIG. 2 is a view similar to that of FIG. 1 showing the apparatus after movement of a body release member to a position just prior to the release of the film advance means.

The operation of the apparatus will now be described with reference to the figures. FIG. 1 shows the apparatus in a cocked condition ready for effecting an exposure. In order to effect an exposure, the operator engages an extension 102 of body release member 82 and urges body release member 82 against the force of spring 88 in a rearward direction. As shown in FIG. 2, as nose 94 of body release member 82 moves away from contact 96, switch 98 is allowed to close and activate an electronic exposure control circuit (not shown) that controls electromagnet 22. Extension 90 on body release member 82 also moves out of the path of upright extension 92 on shutter actuating member 26 and tail portion 99 moves into engagement with tab 100 on latch member 58.

Figure 3:
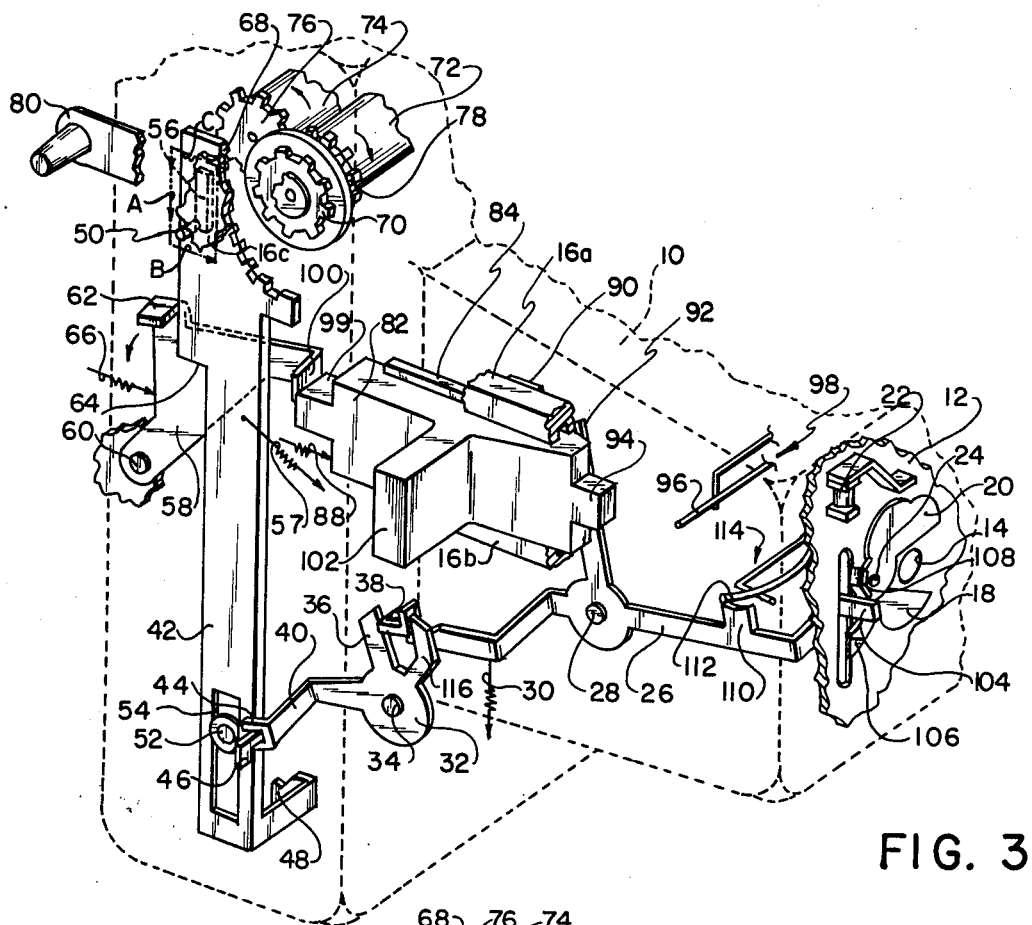
FIG. 3 is a view similar to that of FIG. 1 showing the apparatus after initiation of an exposure, but prior to the return of the body release member.

As body release member 82 continues to move in a rearward direction, tail portion 99 causes latch member 58 to rotate in a counterclockwise direction against the force of spring 66 to thereby release edge 64 on film advance member 42. As tab 62 releases edge 64, film advance member 42 is urged in a generally downward direction by spring 57. A film advance member 42 moves in a downward direction, latch member 32 is caused to rotate in a counterclockwise direction about pin 34 until first leg 36 releases extension 38 of shutter actuating member 26. When the shutter actuating member 26 is released, it is rotated by the force of spring 30 in a counterclockwise direction around pivot 28 to a second position as shown in FIG. 3. An impact portion 104 on shutter actuating member 26 leaves a first tab 106 on opening blade 18 and engages a second tab 108 on opening blade 18 to pivot opening blade 18 about pin 24 to thereby initiate an exposure. At the same time that blade 18 is opened by shutter actuating member 26, an extension 110 on shutter actuating member 26 engages a resilient contact 112 of a normally closed shutter timing switch 114. Shutter timing switch 114 is connected to the electronic exposure control circuit (not shown) and the opening thereof initiates the shutter timing sequence. When the electronic exposure control circuit determines that sufficient time has elapsed for a correct exposure, electromagnet 22 is de-energized to allow closing blade 20 to rotate in a clockwise direction about pin 24 to terminate the exposure. A more detailed description of th operation of the shutter mechanism is contained in U.S. Pat. application Ser. No. 780,150, entitled LOW-INERTIA ELECTRONIC SHUTTER, filed Mar. 22, 1977 in the name of G. Asker.

The downward motion of film advance member 42 under the influence of spring 57 was arrested prior to pin 50 passing under island 56 by means such as the engagement of a third leg 116 on latch 32 with extension 38 of shutter actuating member 26, as shown in FIG. 3. Alternatively, an extension (not shown) on film advance member 42 could engage a portion of body release member 82 to arrest the movement of film advance member at the position shown in FIG. 3. See referenced application Ser. No. 780,148.

When the operator allows body release member 82 to return to its normal rest position under the influence of spring 88, extension 90 on body release member 82 engages upright extension 92 on shutter actuating member 26 to rotate shutter actuating member 26 about pin 28 in a clockwise direction against the force of spring 30 to thereby cock the shutter. As shutter actuating member 26 rotates in a clockwise direction, extension 38 moves out of engagement with extension 116 on latch member 32 thereby allowing latch member 32 to continue to rotate in a counterclockwise direction and thus allowing film advance member 42 to continue in a generally downward direction under the influence of spring 57 to the position shown in FIG. 4. As pin 50 clears the bottom side of island 56, spring 57 rotates film advance member 42 in a generally counterclockwise direction to engage the top teeth of L-shaped rack portion 68 with the teeth of gear 70. It can also be seen in FIG. 4, that leg 116 has moved underneath extension 38 of shutter actuating member 26 to thereby latch shutter actuating member 26 in its cocked position. As can be seen from FIG. 4, as long as latch member 32 remains in the position shown, further operation of body release member 82 cannot cause an actuation of the shutter. Thus, second leg 116 on latch member 32 performs as a double exposure prevention latch.

Figure 4:
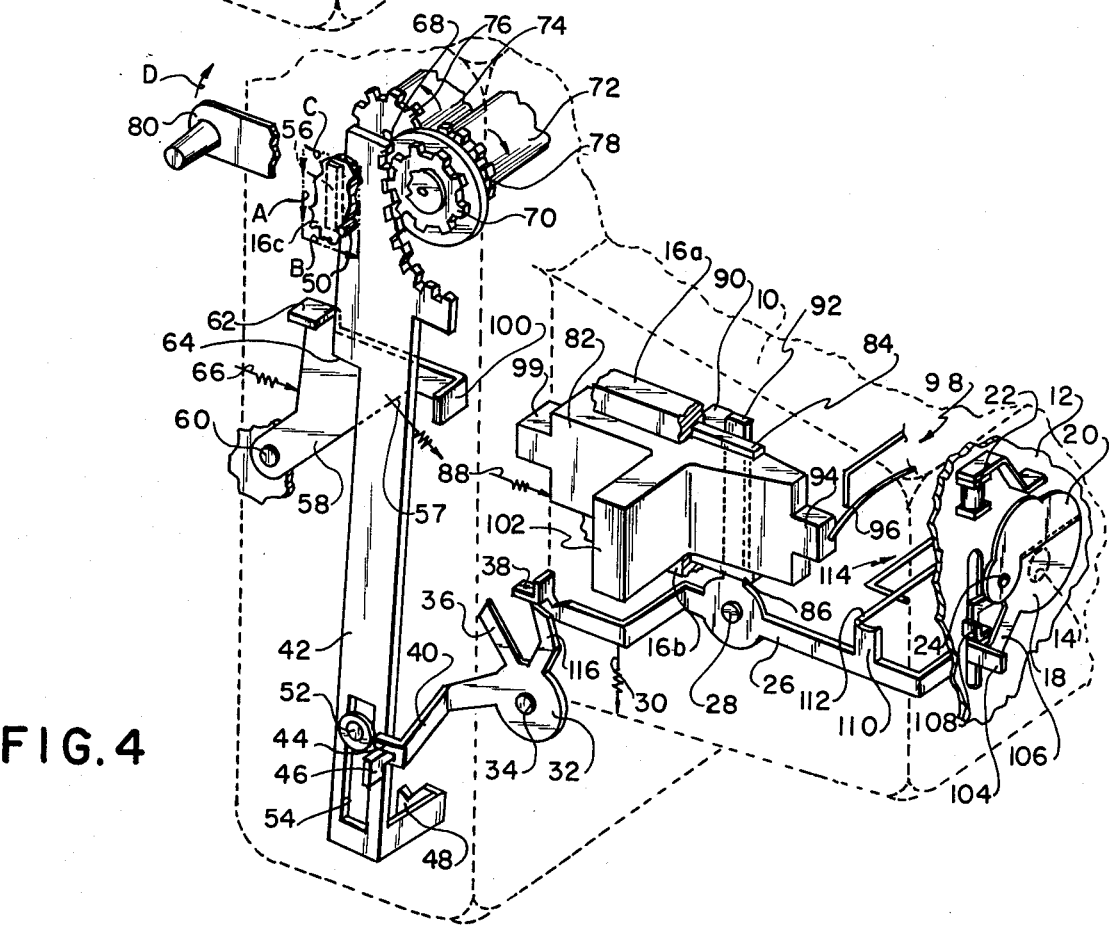
FIG. 4 is a view similar to that of FIG. 1 showing the apparatus after completing an exposure but prior to advancing film.

In order to advance film and prepare for the next exposure, the camera operator turns crank 80 in the direction of arrow D shown in FIG. 4. As gear 70 turns, the film advance member 42 is driven in a generally upward direction against the force of spring 57 until pin 50 is driven over the top of island 56 by the bottom leg of L-shaped rack portion 68 to return the apparatus to the position shown in FIG. 1. As edge 64 of film advance member 42 passes tab 62, latch member 58 rotates in a counterclockwise direction under the influence of spring 66 to its latching position to hold film advance member 42 in its first position as shown in FIG. 1 until the operator once again actuates body release member 82.

The invention has been described in detail with particular reference to a preferred embodiment thereof, but it will be understood that variations and modifications can be effected within the spirit and scope of the invention.

I claim:

1. In a photographic camera having a shutter, the combination comprising:
    shutter actuating means adapted to move from a first position to a second position for opening the shutter;
    body release means, biased toward a first position and movable to a second position for initiating a photographic operation, said body release means cooperating with said shutter actuating means to move said shutter actuating means to its first position in response to movement of said body release means from its second position to its first position;
    film advance means releasably held in a first position and movable from said first position through an intermediate position to a second position preparatory to advancing film and movable from said second position toward said first position for advancing film, said film advance means being adapted to be released from said first position to move to said intermediate position in response to movement of said body release means to its second position and adapted to move from said intermediate position to said second position in response to movement of said body release means from its second position toward its first position; and
    latch means coupled to said film advance means and cooperating with said shutter actuating means for releasably retaining said shutter actuating means for releasably retaining said shutter actuating means in its first position when said film advance means is in its first position or its second position and for releasing said shutter actuating means in response to movement of said film advance means from its first position to its intermediate position.

2. In a photographic camera, the combination comprising:
    body release means, biased toward a first position and movable to a second position for initiating a photographic operation;
    shutter actuating means, adapted to be releasably held in a first position and biased for movement to a second position for opening the shutter and adapted to be moved from said second position to said first position in response to movement of said body release means from said second position to said first position;
    film advance means releasably held in a first position and biased to move: (a) to an intermediate position in response to movement of said body release means to its second position, and (b) to a second position in response to movement of said body release means from its second position to its first position, and said film advance means being movable from said second position to said first position for advancing film; and
    a latch coupled to said film advance means, said latch being mounted in the camera for pivotal movement in response to movement of said film advance means, said latch having a first portion disposed in latching relation with said shutter actuating means when said film advance means is in said first position to hold said shutter actuating means in said first position, said first portion being adapted to move out of latching relation in response to movement of said film advance means from said first position, said latch having a second portion adapted to be disposed in latching relation with said shutter actuating means when said film advance means is in said second position, thereby preventing shutter opening until said film advance means is moved from said second position.

3. In a photographic camera having an impact shutter, the combination comprising:
    a body release member biased toward a first position and movable to a second position to initiate an exposure cycle;
    a pivotally mounted shutter actuating lever movable from a cocked position to a released position and having a first portion adapted to be releasably engaged to hold said high energy lever in said cocked position;
    a slidably mounted film advance member biased to move from a first position to an intermediate position in repsonse to movement of said body release member from its first position to its second position and to move from said intermediate position to a second position in response to movement of said body release member to its first position and movable from its second position to its first position to advance film; and
    a pivotally mounted latch having first and second legs, said latch being coupled to said film advance member and adapted to pivot in response to movement of said film advance member such that said first leg is disposed to engage said second portion of said shutter actuating lever when said film advance member is in said first position and said second leg is disposed to engage said second portion of said shutter actuating lever when said film advance member is in said second position whereby said shutter actuating lever is released to open the shutter when said film advance member is moved from said first position to said intermediate position, and said shutter actuating lever is prevented from moving to open the shutter when said film advance member is in said second position.

* * * * *

UNITED STATES PATENT OFFICE
CERTIFICATE OF CORRECTION

PATENT NO. : 4,110,771
DATED : Aug. 29, 1978
INVENTOR(S) : Guilford E. Kindig

It is certified that error appears in the above-identified patent and that said Letters Patent are hereby corrected as shown below:

| | |
|---|---|
| Col. 3, Line 44 | Please delete "or" and substitute therefor --of-- |
| Col. 4, Line 7 | Please delete "on" and substitute therefor --of-- |
| Col. 4, Line 10 | Please delete "A" and substitute therefor --As-- |
| Col. 4, Line 33 | Please delete "th" and substitute therefor --the-- |
| Col. 4, Line 34 | Please delete "application" and substitute therefor --Application-- |
| Col. 4, Line 46 | Please delete "application" and substitute therefor --Application-- |
| Col. 5, Line 53 | Please delete "for releasably retaining said shutter actuating" |
| Col. 5, Line 54 | Please delete "means" |

Signed and Sealed this

Tenth Day of April 1979

[SEAL]

Attest:

RUTH C. MASON
Attesting Officer

DONALD W. BANNER
Commissioner of Patents and Trademarks